(12) United States Patent
Hosokawa et al.

(10) Patent No.: US 12,507,642 B2
(45) Date of Patent: Dec. 30, 2025

(54) METHOD OF CULTIVATING FRUIT VEGETABLE PLANT

(71) Applicant: FUJIFILM CORPORATION, Tokyo (JP)

(72) Inventors: Takafumi Hosokawa, Kanagawa (JP); Akiko Hattori, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/528,796

(22) Filed: Dec. 5, 2023

(65) Prior Publication Data

US 2024/0099208 A1 Mar. 28, 2024

Related U.S. Application Data

(63) Continuation of application No. PCT/JP2022/017412, filed on Apr. 8, 2022.

(30) Foreign Application Priority Data

Jun. 24, 2021 (JP) ................................. 2021-104916

(51) Int. Cl.
*A01G 31/00* (2018.01)
*A01G 22/05* (2018.01)

(52) U.S. Cl.
CPC ............. *A01G 31/00* (2013.01); *A01G 22/05* (2018.02)

(58) Field of Classification Search
CPC ................ A01G 31/00; A01G 31/0232; A01G 31/0233; A01G 31/024; A01G 31/065
See application file for complete search history.

(56) References Cited

U.S. PATENT DOCUMENTS

| | | | |
|---|---|---|---|
| 4,488,377 A | 12/1984 | Sjostedt | |
| 2014/0215912 A1 | 8/2014 | Takeuchi et al. | |
| 2016/0262324 A1 | 9/2016 | Yamane | |
| 2022/0007655 A1* | 1/2022 | Zhou | B01D 11/0292 |
| 2022/0087120 A1* | 3/2022 | Singer | A01G 31/00 |
| 2023/0380359 A1* | 11/2023 | Vergeldt | A01G 31/02 |

FOREIGN PATENT DOCUMENTS

| | | |
|---|---|---|
| CN | 101258832 A | 9/2008 |
| CN | 105230463 A | 1/2016 |
| CN | 105764329 A | 7/2016 |
| CN | 106035013 A | 10/2016 |
| CN | 207075360 U | 3/2018 |

(Continued)

OTHER PUBLICATIONS

Extended European Search Report dated Oct. 11, 2024, issued in corresponding EP Patent Application No. 22828049.1.

(Continued)

*Primary Examiner* — Kristen C Hayes
(74) *Attorney, Agent, or Firm* — SOLARIS Intellectual Property Group, PLLC

(57) ABSTRACT

A method of cultivating a fruit vegetable plant, including raising seedlings of the fruit vegetable plant by a flooded hydroponic method using a culture solution having a dissolved oxygen concentration of 3.2 mg/l or more in an environment in which one or more conditions selected from the group consisting of temperature, relative humidity, and light are controlled.

20 Claims, 1 Drawing Sheet

(56) References Cited

FOREIGN PATENT DOCUMENTS

| | | |
|---|---|---|
| CN | 110036837 A | 7/2019 |
| EP | 3369310 A1 | 9/2018 |
| JP | H07-14303 B2 | 2/1995 |
| JP | 2007-006859 A | 1/2007 |
| JP | 4610695 B2 | 1/2011 |
| JP | 2011-193851 A | 10/2011 |
| JP | 2014-166181 A | 9/2014 |
| JP | 2015-084750 A | 5/2015 |
| JP | 2015-097515 A | 5/2015 |
| WO | 2020/060796 A1 | 3/2020 |

OTHER PUBLICATIONS

International Search Report issued in International Application No. PCT/JP2022/017412 on Jun. 21, 2022.
Written Opinion of the ISA issued in International Application No. PCT/JP2022/017412 on Jun. 21, 2022.
English language translation of the following: Office action dated Mar. 18, 2025 from the JPO in a Japanese patent application No. 2023-529638 corresponding to the instant patent application.
English language translation of the following: Notice dated Aug. 14, 2025 from the SIPO in a Chinese patent application No. 202280042169.6 corresponding to the instant patent application. This office action translation is submitted now in order to supplement the understanding of the cited references which are being disclosed in the instant Information Disclosure Statement.

\* cited by examiner

METHOD OF CULTIVATING FRUIT VEGETABLE PLANT

CROSS-REFERENCE TO RELATED APPLICATIONS

This application is a continuation application of International Application No. PCT/JP2022/017412, filed Apr. 8, 2022, the disclosure of which is incorporated herein by reference in its entirety. Further, this application claims priority from Japanese Patent Application No. 2021-104916, filed Jun. 24, 2021, the disclosure of which is incorporated herein by reference in its entirety.

BACKGROUND OF THE INVENTION

1. Field of the Invention

The present invention relates to a method of cultivating a fruit vegetable plant.

2. Description of the Related Art

In recent years, an artificial light type plant factory in which a plant such as a vegetable is cultivated by using an artificial light source such as a light emitting diode (LED) in a closed space is attracting attention.

Cultivation of plants in an artificial light type plant factory is not affected by the climate and the weather, and the problem of labor shortage can be solved. Therefore, plants can be cultivated throughout a year under certain conditions.

For example, JP1995-14303B (JP-H07-14303B) discloses a method of cultivating a fruit vegetable plant including raising seedlings in an environment control room using artificial light for a period of 10 days to 40 days after seeding, and then transferring to a field to be cultivated.

In addition, JP4610695B discloses a method of raising seedlings using an Ebb & Flow hydroponic method (bottom surface supply hydroponic method) in an artificial light type plant factory.

Specifically, in an artificial light type plant factory, artificial lighting and an irrigation device are provided in each shelf of a multi-stage shelf. This irrigation device has a shallow quadrangular box shape in an external form, and includes an irrigation feeder on one side wall surface of the box, a drain groove on opposite side wall surfaces of the box, a resin porous sheet laid on a bottom wall surface, and an automatic control device that intermittently irrigating from the irrigation feeder. A method of raising seedlings using a multi-stage shelf type seedling raising apparatus in which a plurality of cell trays filled with a culture medium for raising seedlings are placed on each shelf of the irrigation device, and irrigating can be performed intermittently from the tray bottom wall surface of each of the cell trays, is disclosed.

SUMMARY OF THE INVENTION

A demand for cultivation efficiency of fruit vegetable plants cultivated in an artificial light type plant factory or the like is increasing year by year, and a method of cultivating a fruit vegetable plant with more excellent cultivation efficiency is strongly required.

A period until budding of a fruit vegetable plant (particularly, the first budding) particularly affects the cultivation efficiency of the fruit vegetable plant. The start of budding is used as an indicator of the transition from vegetative growth to reproductive growth, and by shortening the period until budding, fruiting and fruit growth can be promoted at an early stage, therefore cultivation efficiency is improved.

In the method of cultivating disclosed in JP1995-14303B (JP-H07-14303B) and JP4610695B, a period until budding is long, and the cultivation efficiency is not sufficient.

The present disclosure has been made in view of the above circumstances, and an object to be solved thereof is to provide a method of cultivating a fruit vegetable plant in which a period until budding of a fruit vegetable plant can be shortened and efficient cultivation of the fruit vegetable plant is possible.

Specific means for achieving the object are as follows.

<1> A method of cultivating a fruit vegetable plant, including:
raising seedlings of the fruit vegetable plant by a flooded hydroponic method using a culture solution having a dissolved oxygen concentration of 3.2 mg/l or more in an environment in which at least one condition selected from the group consisting of temperature, relative humidity, and light is controlled.

<2> The method of cultivating a fruit vegetable plant according to <1>, in which the raising seedlings of the fruit vegetable plant is carried out by using a flooded hydroponic seedling raising apparatus including a support that supports the fruit vegetable plant, a panel having a hole for fixing the support, and a culture solution tank in which the culture solution is accommodated, and an area of a support surface of the support is 9 $cm^2$ to 40 $cm^2$.

<3> The method of cultivating a fruit vegetable plant according to <2>, in which the panel has a plurality of the holes for fixing the support, and
an interval between adjacent fruit vegetable plants supported by the support is 10 cm to 30 cm.

<4> The method of cultivating a fruit vegetable plant according to <2> or <3>, in which the flooded hydroponic seedling raising apparatus includes a circulation mechanism that carries out supplying of the culture solution to the culture solution tank and discharging of the culture solution from the culture solution tank, and
a flow rate of the culture solution is 2.0 l/min to 20 l/min in at least one of the supplying of the culture solution to the culture solution tank or the discharging of the culture solution from the culture solution tank.

<5> The method of cultivating a fruit vegetable plant according to any one of <2> to <4>, in which the flooded hydroponic seedling raising apparatus includes an oxygen supply mechanism that supplies oxygen to the culture solution.

<6> The method of cultivating a fruit vegetable plant according to any one of <1> to <5>, in which the fruit vegetable plant is a tomato or a melon.

<7> The method of cultivating a fruit vegetable plant according to any one of <1> to <6>, further including planting the fruit vegetable plant after the raising seedlings, and cultivating the fruit vegetable plant after the planting using a cultivation apparatus including at least one selected from the group consisting of a light source for irradiating the fruit vegetable plant with artificial light from at least one of an upper surface direction or side surface direction of the fruit vegetable plant, a hydroponic cultivation mechanism, and a temperature/humidity control mechanism.

According to the present disclosure, it is possible to provide a method of cultivating a fruit vegetable plant in which a period until budding of a fruit vegetable plant can be shortened and efficient cultivation of the fruit vegetable plant is possible.

DESCRIPTION OF THE PREFERRED EMBODIMENTS

Figure 1:
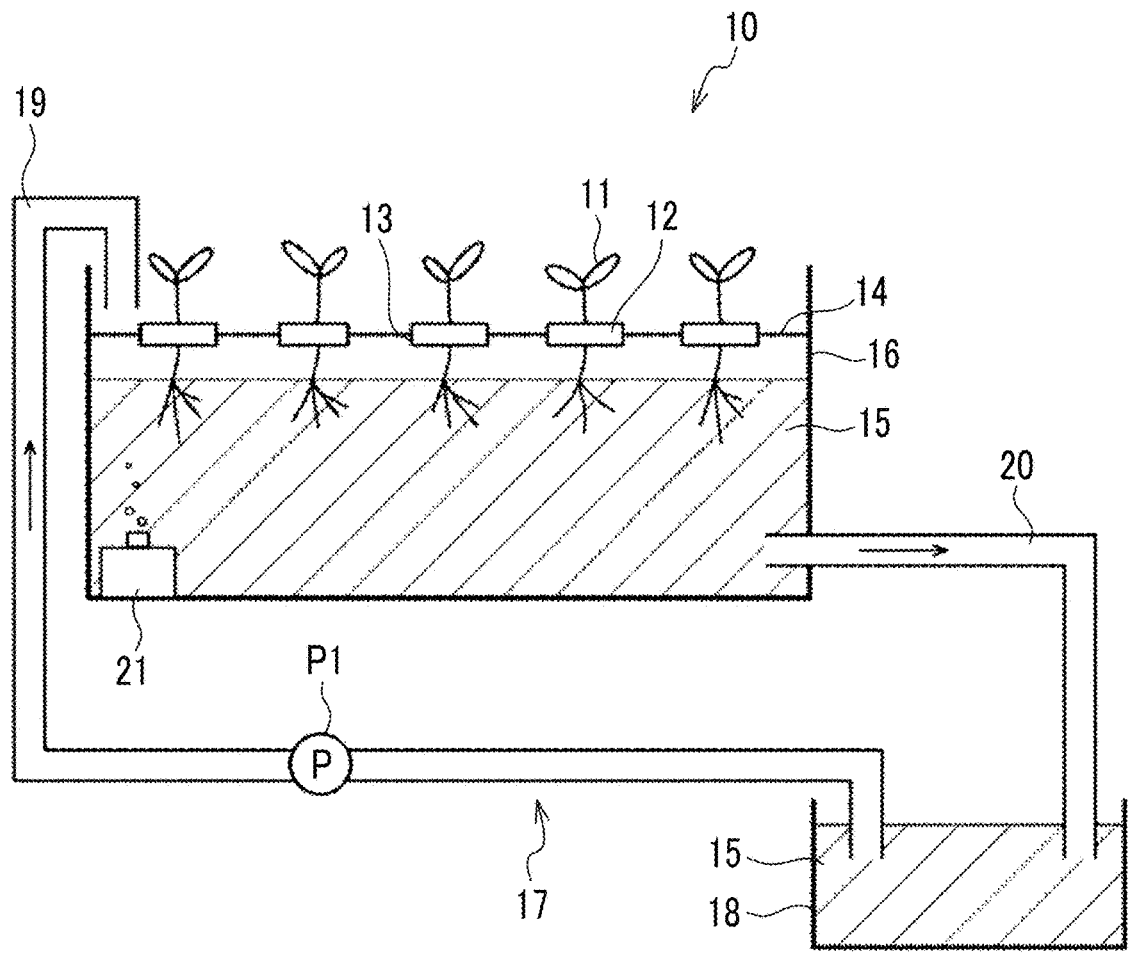
FIG. 1 is a schematic cross-sectional view showing an embodiment of a flooded hydroponic seedling raising apparatus that can be used in a method of cultivating a fruit vegetable plant of the present disclosure.

Hereinafter, embodiments for performing the present disclosure are described in detail. However, the present disclosure is not limited to the following embodiments. In the following embodiments, the components (including elements, steps, and the like) are not essential unless otherwise specified. The same applies to numerical values and ranges thereof, which do not limit the present disclosure.

In the present disclosure, a numerical range represented using "to" includes numerical values before and after "to" as a minimum value and a maximum value, respectively.

In a numerical range described in a stepwise manner in the present disclosure, an upper limit or a lower limit described in one numerical range may be replaced with an upper limit value or a lower limit value in another numerical range described in a stepwise manner. In addition, in a numerical range described in the present disclosure, an upper limit value or a lower limit value in the numerical range may be replaced with a value described in Examples.

In the present disclosure, a step such as raising seedlings included in the method of cultivating a fruit vegetable plant includes, in addition to a step independent of other steps such as cultivation after planting and germination, a step that achieves a desired effect of the step even in a case of not being clearly distinguished from the other step.

In the present disclosure, the "fruit vegetable plant" means a plant of which harvested product is a fruit.

In the present disclosure, the "culture solution" means a solution in which nutritional components (inorganic substances, organic substances) required for growth of a plant are dissolved in water or the like.

In the present disclosure, the "support surface of a support" means a surface of the support on which seeds of a fruit vegetable plant are seeded.

In the present disclosure, a "period until budding" means a period from the start of raising seedlings until the major axis length of the bud reaches 1 mm or more.

[Method of Cultivating Fruit Vegetable Plant]
(Raising Seedlings)

The method of cultivating a fruit vegetable plant of the present disclosure includes raising seedlings of the fruit vegetable plant by a flooded hydroponic method using a culture solution having a dissolved oxygen concentration of 3.2 mg/l or more in an environment in which one or more conditions selected from the group consisting of temperature, relative humidity, and light are controlled.

According to the method of cultivating a fruit vegetable plant of the present disclosure, a period until budding can be shortened and efficiently cultivating a fruit vegetable plant is possible.

The reason why the above effect is exhibited is presumed as follows, but is not limited thereto.

In the method of cultivating a fruit vegetable plant of the present disclosure, raising seedlings of the fruit vegetable plant is carried out by the flooded hydroponic method. However, it is presumed that since the fruit vegetable plant can always take in water and nutrient from the root immersed in the culture solution, the growth rate is increased and thus the period until budding is shortened.

In addition, in the raising of the seedlings by the flooded hydroponic method, it is presumed that since the fruit vegetable plants disposed to be adjacent to each other can be stretched without bringing the roots into contact with each other and the water and nutrient contained in the culture solution is efficiently taken in, the growth rate is increased and the period until budding is shortened.

In addition, in the flooded hydroponic method, it is presumed that the growth rate is further increased and the period until budding is shortened by using a culture solution having a dissolved oxygen concentration of 3.2 mg/l or more.

The dissolved oxygen concentration of the culture solution is preferably 3.5 mg/l or more, more preferably 4.5 mg/l or more, and even more preferably 6.0 mg/l or more.

By setting the dissolved oxygen concentration of the culture solution within the above-described numerical range, the growth of the fruit vegetable plant is more vigorous, and the period until budding can be further shortened.

In addition, the upper limit value of the dissolved oxygen concentration of the culture solution is not particularly limited. The higher it is, the more preferable it is, and it is preferable to set it to a saturated concentration at the temperature of the culture solution to be used. For example, at 1 atm, a saturated dissolved oxygen concentration of distilled water at 27° C. is 7.87 mg/l.

In the present disclosure, the dissolved oxygen concentration of the culture solution is measured in the culture solution at 27° C. by using an oxygen concentration monitor device (for example, Seven2Go Pro manufactured by Mettler-Toledo International Inc.).

The oxygen concentration monitor device can be disposed and used in a culture solution tank in which the culture solution is accommodated.

The dissolved oxygen concentration of the culture solution can be adjusted by using an oxygen supply mechanism, adjusting the circulation rate of the culture solution, or the like.

From the viewpoint of shortening the period until budding, it is preferable for the culture solution to use a liquid fertilizer or the like containing a fertilizer element required for plant growth.

The liquid fertilizer to be used is not particularly limited, and for example, a commercially available mixed liquid fertilizer (OAT House 1 manufactured by OAT Agrio Co., Ltd., Home Hyponica manufactured by Kyowa Co., Ltd., or the like) may be used by dissolving or diluting to a desired concentration, and a straight fertilizer may be used in combination based on a known fertilizer composition such as the Enshi standard nutrient solution and Yamazaki nutrient solution.

As a concentration indicator of a culture solution, an electrical conductivity (EC) value is generally used. The EC value of the culture solution in the present invention is preferably 0.3 dS/m to 5.0 dS/m and more preferably 0.8 dS/m to 2.0 dS/m.

The EC value of the culture solution is measured in the culture solution at 27° C. by using an electric conductivity meter (for example, HI98131 manufactured by Hanna Instruments).

The EC value of the culture solution can be adjusted, for example, by adding a liquid fertilizer or the like to the culture solution.

From the viewpoint of shortening the period until budding, the pH of the culture liquid is preferably 3.5 to 8.0 and more preferably 4.5 to 7.0.

The pH of the culture solution is measured in the culture solution at 27° C. by using a pH monitor device (for example, HI98131 manufactured by Hanna Instruments).

The pH of the culture solution can be adjusted, for example, by adding hydrochloric acid, sodium hydroxide, or the like to the culture solution.

In the method of cultivating a fruit vegetable plant in the present disclosure, raising of the seedlings of the fruit vegetable plant is carried out in an environment in which one or more conditions selected from the group consisting of temperature, relative humidity, and light are controlled.

From the viewpoint of cultivation efficiency, the raising of the seedlings is preferably performed in an environment in which the light condition is controlled.

Examples of the temperature conditions include a light period temperature, a dark period temperature, and the like.

From the viewpoint of shortening the period until budding, raising seedlings of the fruit vegetable plant is carried out in an environment in which the light period temperature is controlled to preferably 25° C. to 30° C. and more preferably 26° C. to 28° C.

In addition, from the viewpoint of shortening the period until budding, raising seedlings of the fruit vegetable plant is carried out in an environment in which the dark period temperature is controlled to preferably 15° C. to 25° C. and more preferably 17° C. to 23° C.

The light period temperature and the dark period temperature are measured in a state where a thermometer is disposed at a position 1 cm away from the fruit vegetable plant. As the thermometer, for example, a temperature/humidity sensor THA-3151 manufactured by T&D Corporation can be used.

In the present disclosure, the "light period" means a period during which the fruit vegetable plant is subjected to irradiation by the light source. In addition, in the present disclosure, the "dark period" means a period during which the fruit vegetable plant is not subjected to irradiation by the light source.

A method of controlling the light period temperature and the dark period temperature is not particularly limited and the light period temperature and the dark period temperature can be controlled by using a known method in the related art. For example, the controlling of the light period temperature and the dark period temperature can be performed by monitoring the light period temperature and the dark period temperature of the seedling raising environment with the above-described thermometer, and sending hot air or cold air as necessary.

From the viewpoint of shortening the period until budding, raising seedlings of the fruit vegetable plant is carried out in an environment in which the relative humidity is controlled to preferably 60% to 80% and more preferably 63% to 77%.

The relative humidity is measured in a state where a hygrometer is disposed at a position 1 cm away from the fruit vegetable plant. As the hygrometer, for example, a temperature/humidity sensor THA-3151 manufactured by T&D Corporation can be used.

A method of controlling the humidity is not particularly limited, and the humidity can be controlled by a known method in the related art. For example, the humidity condition can be controlled by monitoring the humidity of the seedling raising environment with the above hygrometer and using, as necessary, an air conditioning device having a humidifying function and a dehumidifying function.

Examples of the light condition include light intensity, light-dark cycle, and the like.

From the viewpoint of shortening the period until budding, the light intensity is preferably 80 µmol/m$^2$·s to 500 µmol/m$^2$·s and more preferably 100 µmol/m$^2$·s to 300 µmol/m$^2$·s.

The light intensity is measured in a state where at a position 1 cm away from the fruit vegetable plant, a light-receiving surface of a measuring instrument is disposed toward the light source. As the measuring instrument, for example, a photon sensor (LI-190R, manufactured by LI-COR, Inc.) and the like can be used. In a case where the light sources are disposed in two or more directions from the fruit vegetable plant, the sum of the light intensities measured by disposing the measuring instrument toward respective light sources is defined as the light intensity.

In addition, from the viewpoint of shortening the period until budding, a ratio (light period time/dark period time) of the light period time to the dark period time is preferably 0.3 to 3 and more preferably 0.5 to 2.

The light intensity can be controlled by changing a type, the number, or the like of the light source (LED, fluorescent lamp, or the like) used, changing the distance between the light source and the seedlings, or using a dimming light source. In addition, the light-dark cycle can be controlled by changing the use time of the light source.

In addition, the raising of the seedlings is preferably carried out in an environment in which the carbon dioxide concentration is controlled.

From the viewpoint of shortening the period until budding, the carbon dioxide concentration is preferably 300 ppm to 2,000 ppm and more preferably 400 ppm to 1,500 ppm.

The carbon dioxide concentration is measured in a state where a carbon dioxide densitometer is disposed at a position 1 cm away from the fruit vegetable plant. As the carbon dioxide densitometer, for example, LI-850 manufactured by LI-COR, Inc. can be used.

The method of controlling the carbon dioxide concentration is not particularly limited, and the carbon dioxide concentration can be controlled by a known method in the related art. For example, the carbon dioxide concentration can be controlled by monitoring the carbon dioxide concentration in the environment with the above-described carbon dioxide densitometer and using an air conditioning device or the like, as necessary.

In the method of cultivating a fruit vegetable plant of the present disclosure, a flooded hydroponic seedling raising apparatus can be used.

As shown in FIG. 1, a flooded hydroponic seedling raising apparatus 10, in regard to raising of the seedlings, can include a support 12 that supports a fruit vegetable plant 11, a panel 14 having a hole 13 for fixing the support 12, and a culture solution tank 16 in which a culture solution 15 are accommodated.

In addition, the flooded hydroponic seedling raising apparatus 10 can include a circulation mechanism 17 that supplies the culture solution 15 to the culture solution tank 16 and discharges the culture solution 15 from the culture solution tank 16.

Furthermore, the circulation mechanism 17 can include a circulation tank 18 in which the culture solution 15 is accommodated, a supply nozzle 19 that supplies the culture solution 15 from the circulation tank 18 to the culture solution tank 16, a discharge nozzle 20 that discharges the culture solution 15 from the culture solution tank 16 to the circulation tank 18, and a pump P1.

In addition, the flooded hydroponic seedling raising apparatus 10 can include the oxygen supply mechanism 21 in the culture solution tank 16.

The support for supporting a fruit vegetable plant is not particularly limited, and is preferably formed of a material having both appropriate water permeability and appropriate water retentivity. The support is particularly preferably a urethane sponge, a phenol resin sponge, a rock wool, a support table provided with a water-retaining sheet, or the like.

In a case where the flooded hydroponic seedling raising apparatus including the support that supports the fruit vegetable plant, the panel having the hole for fixing the support, and the culture solution tank in which the culture solution is accommodated is used for raising seedlings, an area of the support surface of the support that supports the fruit vegetable plant is preferably 9 cm$^2$ to 40 cm$^2$ and more preferably 20 cm$^2$ to 36 cm$^2$.

In a case where seedlings of a leaf vegetable plant are raised by the flooded hydroponic seedling raising apparatus, the area of the support surface of the support is usually 1 cm$^2$ to 4 cm$^2$. However, in the method of cultivating a fruit vegetable plant of the present disclosure, in a case where the area of the support surface of the support provided in the flooded hydroponic seedling raising apparatus is set to 9 cm$^2$ or more, the support can be easily removed from the panel after raising seedlings. As a result of the described above, the support and the fruit vegetable plant supported by the support can be removed from the panel without damaging the extended roots.

In addition, in a case where the area of the support surface of the support is set to 40 cm$^2$ or less, it is possible to prevent the support from not completely supporting the fruit vegetable plant due to the deflection, the water content, or the like of the support during raising seedlings, and thus falling from the panel. Therefore, it is possible to prevent the root from being damaged by the falling.

By maintaining a root state excellent, it is possible to favorably promote cultivation after planting.

The support removed from the panel is planted together with the fruit vegetable plant in an environment in which main cultivation is performed.

The thickness of the support is not particularly limited, and for example, can be set to be 1 cm to 8 cm.

The panel provided in the flooded hydroponic seedling raising apparatus is not particularly limited, and a resin panel, an expanded polystyrene panel, or the like can be used.

In addition, the size of the hole included in the panel is not particularly limited as long as it is a size at which the support can be held, and a fastener or the like for preventing the support from falling during raising seedlings may be provided.

The number of holes included in the panel is not particularly limited and is preferably adjusted appropriately in consideration with the distance between adjacent seeds, cultivation efficiency, mechanical strength of the panel, and the like.

Figure 2:
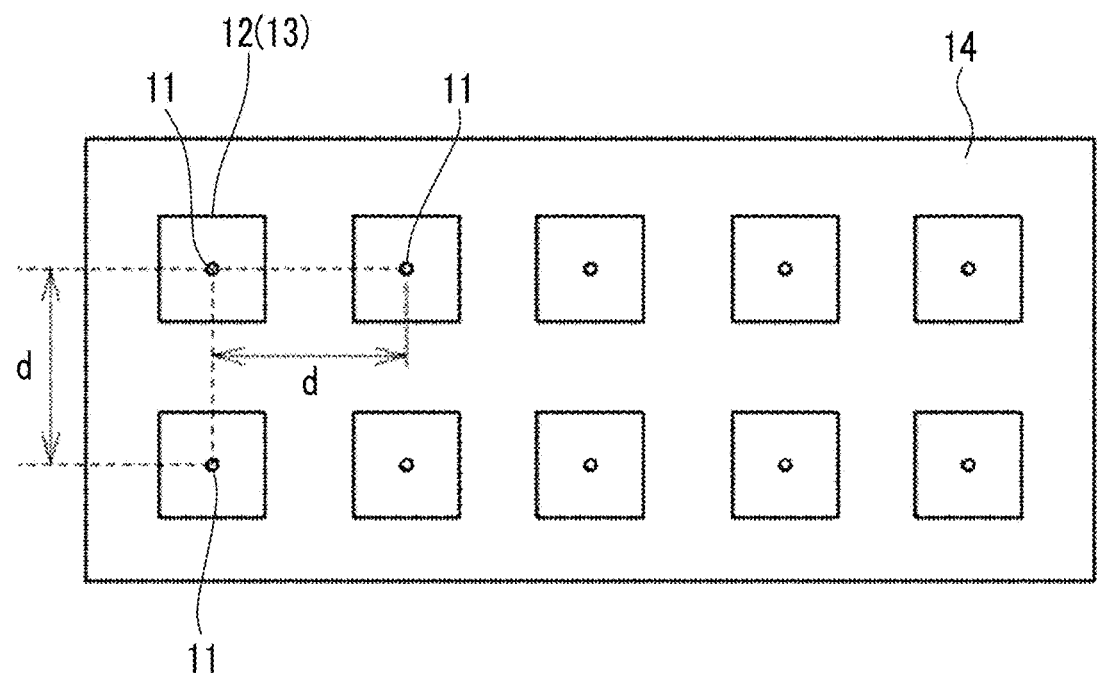
FIG. 2 is a schematic top view of a panel included in the flooded hydroponic seedling raising apparatus of FIG. 1.

FIG. 2 is a top view of the flooded hydroponic seedling raising apparatus 10 shown in FIG. 1. In a case where the panel 14 has a plurality of holes 13 for fixing the support 12, an interval d (hereinafter, also referred to as a distance between strains) between the fruit vegetable plants 11 supported by the adjacent supports 12 is preferably 10 cm to 30 cm, and more preferably 13 cm to 25 cm, and even more preferably 15 cm to 20 cm.

By setting the distance between strains within the above-described numerical range, it is possible to prevent the roots of adjacent fruit vegetable plants from being in contact with each other and entangled with each other, to reduce the frequency of damage to the roots during removal from the panel, and to make the growth after planting good.

In addition, it is possible to prevent the shadow of the leaf of one fruit vegetable plant from overlapping the leaf of the other fruit vegetable plant, particularly in the late seedling raising period, and to make the growth of the entire fruit vegetable plant more uniform, and to further shorten the period until budding as a whole.

In FIG. 2, the holes 13 have the same size as the support 12, and these are denoted by reference numeral 12 (13).

The volume, shape, and the like of the culture solution tank are not particularly limited as long as the above-described panel can be fixed and the culture solution can be accommodated.

The liquid surface of the culture solution accommodated in the culture solution tank and the surface of the panel on the culture solution tank side may be in contact with each other, but the distance therebetween is preferably 1 mm to 10 mm and more preferably 3 mm to 8 mm. By setting the distance between the liquid surface of the culture solution accommodated in the culture solution tank and the surface of the panel on the culture solution tank side within the above-described numerical range, the root developed from the fruit vegetable plant are sufficiently immersed in the culture solution and thus can take in nutrient, oxygen, and the like, and the root can take in the oxygen present between the liquid surface and the panel surface. Therefore, the period until budding is further shortened.

In addition, as shown in FIG. 1, raising of the seedlings can be carried out in a state where the roots developed from the fruit vegetable plant are immersed in the culture solution accommodated in the culture solution tank. However, from the viewpoint of shortening the period until budding, in a case where the total volume of the roots developed from the fruit vegetable plant is 100, it is preferable that 60 or more roots, more preferably 70 or more roots, and even more preferably 80 or more roots are immersed in the culture solution.

The circulation mechanism is not particularly limited as long as the circulation mechanism can be applied to the flooded hydroponic seedling raising apparatus, and a known mechanism in the related art can be used.

In addition, the circulation mechanism can include a circulation tank, a supply nozzle, and a discharge nozzle, and a volume of the circulation tank, a length of the supply nozzle and the discharge nozzle, a thickness of the supply nozzle and the discharge nozzle, and the like are not particularly limited and preferably appropriately adjusted.

In a case where the flooded hydroponic seedling raising apparatus includes a circulation mechanism, the flow rate of the culture solution in at least one of the supply of the culture solution to the culture solution tank or the discharge of the culture solution from the culture solution tank is preferably 2.0 l/min to 20 l/min and more preferably 2.5 l/min to 15 l/min. By setting the flow rate of the culture solution within the above-described numerical range, the dissolved oxygen concentration of the culture solution can be increased and the period until budding can be further shortened.

From the viewpoint of shortening the period until budding, it is preferable that at least the flow rate of the culture solution in the supply of the culture solution to the culture solution tank satisfies the above-described numerical range.

The flooded hydroponic seedling raising apparatus can include an oxygen supply mechanism that supplies oxygen to the culture solution. Accordingly, the dissolved oxygen concentration of the culture solution can be improved.

The oxygen supply mechanism can include an oxygen supply port and the oxygen supply port can be disposed in the culture solution tank. In addition, in a case where a difference in the dissolved oxygen concentration of the culture solution occurs depending on the position in the culture solution tank, the oxygen supply mechanism is disposed at a position where the dissolved oxygen concentration is low, and the dissolved oxygen concentration of the culture solution accommodated in the culture solution tank can be made uniform.

In addition, oxygen can be supplied to the culture solution also by disposing the oxygen supply port outside the culture solution tank and introducing a tube or the like connected to the oxygen supply port into the culture solution tank.

Furthermore, oxygen can be supplied to the culture solution also by providing a hole in the supply nozzle of the circulation mechanism and allowing the culture solution to flow while entraining the air.

Examples of the oxygen supply mechanism include an air pump (for example, tetra air pump OX-45, manufactured by Spectrum Brands Holdings, Inc.) and an air taking device (for example, Hyponica air taking device, manufactured by Kyowa Co., Ltd.).

In a case where the flooded hydroponic seedling raising apparatus includes a circulation mechanism, the above-described oxygen concentration monitor devices are preferably disposed respectively at a position 20 cm to 80 cm away from the culture solution supply position and the culture solution discharge position in the culture solution tank. Accordingly, the difference between the dissolved oxygen concentration at the culture solution supply position and the dissolved oxygen concentration at the culture solution discharge position can be monitored. Therefore, the oxygen supply mechanism is disposed at any position where the dissolved oxygen concentration is low, and thus the dissolved oxygen concentration can be made uniform.

In a case where the flooded hydroponic seedling raising apparatus includes a circulation mechanism, the above-described electric conductivity meters are preferably disposed respectively at a position 20 cm to 80 cm away from the culture solution supply position and the culture solution discharge position in the culture solution tank. Accordingly, the difference between the EC value at the culture solution supply position and the EC value at the culture solution discharge position can be monitored. Therefore, a liquid fertilizer or the like is added at any position where the EC value is low, and thus the EC value can be made uniform.

In a case where the flooded hydroponic seedling raising apparatus includes a circulation mechanism, the above-described pH monitor devices are preferably disposed respectively at a position 20 cm to 80 cm away from the culture solution supply position and the culture solution discharge position in the culture solution tank. Accordingly, the difference between the pH at the culture solution supply position and the pH at the culture solution discharge position can be monitored. Therefore, phosphoric acid or the like is added at any position where the pH is low, and thus the pH can be made uniform.

The seedling raising period of the fruit vegetable plant is not particularly limited, but from the viewpoints of growth potential after planting, shortening of the period until budding, and the like, the seedling raising period is preferably 5 days to 40 days, more preferably 10 days to 35 days, even more preferably 12 days to 33 days, and particularly preferably 15 days to 30 days.

Generally, during the seedling raising period, the amount of nutrient or the like absorbed by the fruit vegetable plant from the culture solution is not large, and a change in components of the culture solution is small.

In the method of cultivating a fruit vegetable plant of the present disclosure, it is preferable to manage an EC value and pH of the culture solution as appropriate, and to carry out, as necessary, replacement of the culture solution, addition of a liquid fertilizer, or the like.

The fruit vegetable plant is not particularly limited, and examples thereof include Solanaceae family plants such as a tomato, an eggplant, and a sweet pepper, Cucurbitaceae family plants such as a melon, a cucumber, a pumpkin, and a zucchini, Fabaceae family plants such as a green bean, a pea, and a broad bean, Malvaceae family plants such as an okra, Poaceae family plants such as corn, and the like. Among the fruit vegetable plants described above, the Solanaceae family plants and Cucurbitaceae family plants are suitable for the method of cultivating of the present disclosure, and a tomato or a melon is more suitable.

The tomato includes a medium size tomato, a cherry tomato, a high-sugar tomato, and the like. In addition, the melon includes netted melons such as green flesh and orange flesh, and non-netted melons.

(Cultivation after Planting)

The method of cultivating a fruit vegetable plant of the present disclosure can include planting the fruit vegetable plant after raising seedlings and cultivating the fruit vegetable plant after the planting.

The cultivation of the fruit vegetable plant after planting can be carried out by a known method in the related art, and may be carried out by hydroponic cultivation or soil cultivation.

A cultivation facility for fruit vegetable plants after planting is not particularly limited, and examples thereof include an artificial light type plant factory, a solar type plant factory, a greenhouse, and the like.

From the viewpoints of quality of the harvested fruit and cultivation efficiency, the cultivation of a fruit vegetable plant after planting is preferably carried out using a cultivation apparatus including one or more selected from a light source for irradiating the fruit vegetable plant with artificial light from at least one of an upper surface direction or side surface direction of the fruit vegetable plant, a hydroponic cultivation mechanism, and a temperature/humidity control mechanism.

In addition, the cultivation apparatus further more preferably includes a mechanism that controls a light intensity of a light source, a light-dark cycle, a carbon dioxide concentration, and the like.

The light source which can be included in the above-described cultivation apparatus is a light source that irradiates a fruit vegetable plant with artificial light from at least one of an upper surface direction or a side surface direction of the fruit vegetable plant, and from the viewpoints of space utilization efficiency, irradiation efficiency, and the like, preferably a light source that irradiates the fruit vegetable plant with the artificial light from a side surface direction of the fruit vegetable plant.

The artificial light is not particularly limited as long as it is emitted in at least a part of a wavelength range of 400 nm to 700 nm required for photosynthesis, and examples thereof include light emitted by an LED, a fluorescent lamp, and the like. One type of LED may be used, or two or more types of LEDs may be used. As the LED, an LED that emits visible light such as red, blue, or green can be used, and an LED that emits invisible light of ultraviolet light (wavelength of 380 nm or less) or infrared light (wavelength of 780 nm or more) can be used in combination.

The cultivation apparatus preferably includes a mechanism for controlling the light intensity, light-dark cycle, and the like of the light source, and from the viewpoint of promoting photosynthesis, the light intensity is preferably 100 µmol/m²·s to 1,000 µmol/m²·s and more preferably 150 µmol/m²·s to 500 µmol/m²·s.

The light intensity can be measured by the same method as the measuring method in raising seedlings.

From the viewpoint of promoting photosynthesis, light irradiation may be continuously carried out without providing a dark period, but it is more preferable to provide a dark period. In this case, a ratio (time in light period/time in dark period) of the time in the light period to the time in the dark period is preferably 0.8 to 8 and more preferably 1 to 5.

The hydroponic cultivation mechanism that can be included in the above-described cultivation apparatus is not particularly limited as long as it can carry out a known hydroponic cultivation in the related art, such as flooded hydroponic cultivation, thin film hydroponic cultivation, drip type hydroponic cultivation, spray type hydroponic cultivation, Ebb & Flow cultivation.

In a case where the cultivation apparatus includes a flooded hydroponic cultivation mechanism, an apparatus having the same configuration as the flooded hydroponic seedling raising apparatus may be used as the flooded hydroponic cultivation mechanism. However, in a case where a panel has a plurality of holes for fixing the support, an interval (hereinafter, also referred to as a distance between strains) between strains supported by adjacent supports is preferably 20 cm to 80 cm and more preferably 30 cm to 50 cm. By setting the distance between strains within the above-described numerical range, it is possible to prevent the roots of adjacent strains from being in contact with each other, to prevent the shadow of the leaf of one fruit vegetable plant from overlapping the other fruit vegetable plant, and the like. Thus it is possible to improve the quality of the harvested fruit and the cultivation efficiency.

The temperature/humidity control mechanism which can be included in the above-described cultivation apparatus is not particularly limited, and the above-described thermometer and hygrometer, the device capable of sending hot air or cold air, the air conditioning device, and the like can be used in combination.

From the viewpoint of promoting photosynthesis, the light period temperature is preferably controlled to 15° C. to 35° C. and more preferably controlled to 18° C. to 30° C.

The dark period temperature is preferably controlled to 5° C. to 25° C. and more preferably controlled to 10° C. to 20° C. By setting the dark period temperature within the above-described numerical range, it is possible to suppress the sugar consumption due to respiration of the fruit vegetable plant in the dark period, and to promote budding.

From the viewpoint of promoting photosynthesis, the relative humidity is preferably controlled to 50% to 100% and more preferably controlled to 60% to 90%.

The light period temperature, the dark period temperature, and the relative humidity can be measured by the same method as the measuring method in raising seedlings.

The above-described cultivation apparatus preferably includes a carbon dioxide concentration control mechanism, and the carbon dioxide concentration is preferably 400 ppm to 2,000 ppm and more preferably 500 ppm to 1,200 ppm.

The carbon dioxide concentration can be measured by the same method as the measuring method in raising seedlings.

In the cultivation of a fruit vegetable plant after planting, as necessary, it is preferable to carry out pinching, defoliation, fruit thinning, removal of lateral buds (lateral bud nipping), hanging attraction, or the like.

(Germination)

The method of cultivating a fruit vegetable plant of the present disclosure can further include germinating seeds of the fruit vegetable plant to be used for raising seedlings.

A method of germinating seeds of the fruit vegetable plant is not particularly limited, and the humidity can be adjusted by a known method in the related art. For example, the germination can be carried out by seeding seeds of a fruit vegetable plant on the above-described support sufficiently wetted with water and storing in a dark place.

In addition, it is preferable to select fruit vegetable plants having a similar degree of growth from among the fruit vegetable plants in which germination is confirmed and to carry out raising seedlings. Accordingly, the harvesting time of the fruit can be matched, and the cultivation efficiency can be improved.

The temperature in the germination process varies depending on the item and variety of the fruit vegetable plant to be used, but in a case of commercially available seeds, these are generally disclosed as the germination temperature. In addition, in a case where the germination temperature is unknown, it can be experimentally confirmed. Furthermore, depending on the item and variety of the fruit vegetable plant to be used, it may be necessary to perform a treatment such as dormancy breaking during germination.

In the germination process, there are those that require light of a specific wavelength, those that require to be under darkness, and those germinates in any of the cases. These can be also known in the same manner as the germination temperature.

The relative humidity in the germination process is preferably 70% to 100% and particularly preferably 80% to 95%. By setting the relative humidity to this range, it is possible to prevent drying of a plant body in the germination period and to make the growth good.

The period required for the germination process is not determined to be constant, but it is preferably a period until rooting and subsequent hypocotyl elongation start, generally about several days to one week. By applying this period to the germination process, the roots can be sufficiently grown, and at the same time, it is possible to avoid excessive hypocotyl elongation. Therefore, the growth of seedlings in the subsequent seedling raising process is made good and a period until flowering can be shortened, which is preferable.

EXAMPLES

Hereinafter, the above-described embodiment will be specifically described with reference to Examples, but the above-described embodiment is not limited to these Examples.

Example 1-1

(Germination)

Tomato seeds (variety: Momotaro York (registered trademark), manufactured by TAKII & Co., Ltd) were seeded on a support A ("Yasaihana Pot" (registered trademark) which is 5 cm×5 cm×5 cm square rock wool, manufactured by Nippon Rockwool Corporation) sufficiently containing pure water, stored for 3 days in a dark environment at a temperature of 28° C. and a relative humidity of 70%, and germinated to obtain a tomato plant body.

(Raising Seedlings)

40 strains of tomato plant bodies having a similar degree of growth were selected, and the supports A were fixed to 40 holes included in a panel provided in the flooded hydroponic seedling raising apparatus.

The flooded hydroponic seedling raising apparatus included a panel having holes for fixing the support, a culture solution tank in which the culture solution was accommodated, a circulation mechanism that carries out supplying of the culture solution to the culture solution tank and discharging of the culture solution from the culture solution tank, an oxygen supply mechanism (an air pump) provided in the culture solution tank, an electric conductivity meter of a culture solution provided in the culture solution tank, a dissolved oxygen concentration monitor device, and a pH monitor device.

The distance between strains in the above-described panel was 12 cm in the longitudinal direction and 15 cm in the lateral direction.

In addition, the culture solution accommodated in the culture solution tank was a culture solution (dissolved oxygen concentration: 6.3 mg/l, EC value: 1.3 dS/m, pH: 6.0) obtained by diluting "Hyponica liquid fertilizer" manufactured by Kyowa Co., Ltd. with pure water was used.

In addition, a flow rate of the culture solution in the supply and discharge of the culture solution by the circulation mechanism was 4.0 l/min.

In addition, the panel was an expanded polystyrene having a thickness of 2 cm, and the distance between the liquid surface of the culture solution accommodated in the culture solution tank and the surface of the panel on the culture solution tank side was 5 mm.

Using the above-described flooded hydroponic seedling raising apparatus, raising seedlings was carried out in an environment in which temperature, humidity, light conditions, and the like were controlled as follows.

(Seedling Raising Conditions)
Light source: white LED (PGL-NE-200NWD), manufactured by Ryoden Corporation
Light intensity: 200 μmol/m²·s
Light-dark cycle (light period/dark period): 16 hours/8 hours
Temperature: 27° C. (light period), 19° C. (dark period)
Relative humidity: 80%
Carbon dioxide concentration: 1,000 ppm
Seedling raising period: 30 days (Cultivation after Planting)

10 strains each of the tomato plant bodies after raising seedlings obtained in the above-described Example were planted, and cultivation was carried out for 20 days under the following cultivation conditions. In the planting of the plant body, 10 strains having good growth and having a similar degree of growth were selected.

(Cultivation Conditions)
Light source: LED, CIVILIGHT, manufactured by Showa Denko K.K.
Light intensity: 250 μmol/m²·s
Light-dark cycle (light period/dark period): 14 hours/10 hours
Temperature: 25° C. (light period), 17° C. (dark period)
Relative humidity: 60%
Carbon dioxide concentration: 400 ppm
Fertilization method: flooded hydroponic cultivation Liquid fertilizer: "Hyponica liquid fertilizer" manufactured by Kyowa Co., Ltd. was used by being diluted with pure water
EC value of liquid fertilizer: 2.0 dS/m Example 1-2

Germination, raising seedlings, and cultivation after planting were carried out in the same manner as in Example 1-1, except that the support A was changed to a support B (a urethane sponge) in which an area of support surface was 25 cm², a thickness was 2 cm, and a notch having a depth of 1 cm was formed in the support surface, tomato seeds were seeded in the notch, and the dissolved oxygen concentration of the culture solution was changed to the value shown in Table 1 by an air pump.

Example 1-3

Germination, raising seedlings, and cultivation after planting were carried out in the same manner as in Example 1-1, except that the support A was changed to a support C (a phenol resin sponge, Floral Foam Oasis (registered trademark)) in which an area of support surface was 25 cm² and a thickness was 1 cm, tomato seeds were seeded, and the dissolved oxygen concentration of the culture solution was changed to the value shown in Table 1 by an air pump.

Example 1-4 and Example 1-5

Germination, raising seedlings, and cultivation after planting were carried out in the same manner as in Example 1-1, except that the dissolved oxygen concentration of the culture solution was changed to the value shown in Table 1 by an air pump.

Example 1-6 to Example 1-9

Germination, raising seedlings, and cultivation after planting were carried out in the same manner as in Example 1-2, except that the area of the support surface of the support B was changed to the value shown in Table 1, and the dissolved oxygen concentration of the culture solution was changed to the value shown in Table 1 by an air pump.

Example 1-10 to Example 1-12

Germination, raising seedlings, and cultivation after planting were carried out in the same manner as in Example 1-2, except that the distance between strains was changed to the value shown in Table 1, and the dissolved oxygen concentration of the culture solution was changed to the value shown in Table 1 by an air pump.

In Example 1-11, 30 strains having a similar degree of growth were selected from those in which the germination of tomato seeds was confirmed, and support B each was fixed.

Comparative Example 1-1

Germination, raising seedlings, and cultivation after planting were carried out in the same manner as in Example 1-1, except that raising seedlings was carried out according to the Ebb & Flow hydroponic method (bottom surface supply hydroponic method) instead of the flooded hydroponic method.

In the supply of the culture solution in the raising seedlings by the Ebb & Flow hydroponic method, the support A was disposed on a panel having a plurality of culture solution supply holes such that the distance between strains was 12 cm in the longitudinal direction and 15 cm in the lateral direction, and the supply was performed once for 1 minute every 12 hours such that the support A was immersed in the culture solution from the lower surface thereof to 1 cm.

The culture solution, light conditions, temperature conditions, and humidity conditions which are used, are the same as those in Example 1-1.

Comparative Example 1-2

72-hole cell tray (a one-way cell tray for preventing root winding, black, manufactured by TAKII & Co., Ltd, cell arrangement: 6 holes×12 holes, cell diameter: 4 cm) was filled with rock wool fine granular cotton (manufactured by Nippon Rockwool Corporation) as a support according to a conventional method. Tomato seeds were seeded here and stored for 3 days in a dark environment of a temperature of 28° C. and a relative humidity of 70% in the same manner as in Example 1.

The distance between strains of the seeded tomato seeds was 4.5 cm in the longitudinal direction and 4.5 cm in the lateral direction.

Next, "thinning-out" was carried out as follows before the start of raising seedlings.

The 72-hole cell tray was grouped with 9 holes of 3 longitudinal holes and 3 lateral holes as one group, the tomato plant body was left only in one hole at the center of each group, and the others were removed. In a case where the germinating state of the tomato plant body in the center was not good, the tomato plant body was replaced with a tomato plant body having a good germinating state in other holes.

After the thinning-out, the distance between strains during raising seedling is 13.5 cm in the longitudinal direction and 13.5 cm in the lateral direction.

Subsequent raising seedlings and cultivation after planting were carried out in the same manner as in Comparative Example 1-1.

Comparative Example 1-3

Germination, raising seedlings, and cultivation after planting were carried out in the same manner as in Comparative Example 1-2, except that the support A was changed to a support D (TAKII cultivation soil for seeding, manufactured by TAKII & Co., Ltd).

Comparative Example 1-4

Germination, raising seedlings, and cultivation after planting were carried out in the same manner as in Example 1-1, except that the dissolved oxygen concentration of the culture solution was changed to the value shown in Table 1 by an air pump.

<<Confirmation at Timing of Budding>>

In Examples and Comparative Examples, the time when the formation of buds having a major axis length of 1 mm or more was confirmed in more than half of the tomato plant bodies was confirmed, and the results were summarized in Table 1 as the number of days from the start of raising seedlings.

<<Confirmation of Number of Leaves Per Strain>>

The number of leaves of the tomato plant body after raising seedlings in Examples and Comparative Examples was confirmed, averaged, and summarized in Table 1.

<<Confirmation of Number of Flowering Per Strain>>

The number of flowering of the tomato plant body at the time of planting in Examples and Comparative Examples was confirmed, averaged, and summarized in Table 1. Flowering was confirmed in all the tomato plant bodies in which raising seedlings was carried out in Examples.

The number of flowering includes the number of buds having a major axis length of 1 mm or more among flowered buds and buds before flowering.

<<Confirmation of Growth Potential after Planting>>

In Examples and Comparative Examples, the state of the tomato plant body which had been cultivated for 20 days after planting was evaluated based on the following evaluation standard and is summarized in Table 1.

Since in the tomato plant bodies in Comparative Example 1-1 to Comparative Example 1-4, budding was not seen in raising seedlings for 30 days, the growth potential after planting was not confirmed.

(Cultivation Conditions)
  Light source: LED, CIVILIGHT, manufactured by Showa Denko K.K.
  Light intensity: 250 µmol/m²·s
  Light-dark cycle (light period/dark period): 14 hours/10 hours
  Temperature: 25° C. (light period), 17° C. (dark period)
  Relative humidity: 60%
  Carbon dioxide concentration: 400 ppm
  Fertilization method: flooded hydroponic cultivation
  Liquid fertilizer: "Hyponica liquid fertilizer" manufactured by Kyowa Co., Ltd. was used by being diluted with pure water
  EC value of liquid fertilizer: 2.0 dS/m (Evaluation Standard)
  A: New flowering and fruiting were confirmed in the 10 strains of the tomato plant bodies, and all of the growth was good.
  B: One or more strains of the tomato plant bodies with no new flowering were confirmed.
  C: One or more strains of tomato plant bodies withered.

TABLE 1

| Item | Method of raising seedlings | Support | Size of (area of support surface) | Distance between strains [cm] Longitudinal direction | Distance between strains [cm] Lateral direction | Dissolved oxygen concentration of culture solution [mg/l] | Period for budding (days after start of raising seedlings) | Average number of leaves [leaves/strain] | Average number of flowering [flowers/strain] | Growth potential after planting |
|---|---|---|---|---|---|---|---|---|---|---|
| Example 1-1 | Tomato Flooded hydroponic method | Rock wool | 5 cm × 5 cm | 12 | 15 | 6.3 | 23 | 8.6 | 6.5 | A |

TABLE 1-continued

| | Item | Method of raising seedlings | Support | Size of support (area of support surface) | Distance between strains [cm] Longitudinal direction | Distance between strains [cm] Lateral direction | Dissolved oxygen concentration of culture solution [mg/l] | Period for budding (days after start of raising seedlings) | Average number of leaves [leaves/strain] | Average number of flowering [flowers/strain] | Growth potential after planting |
|---|---|---|---|---|---|---|---|---|---|---|---|
| Example 1-2 | Tomato | Flooded hydroponic method | Urethane sponge | 5 cm × 5 cm | 12 | 15 | 6.4 | 21 | 8.7 | 6.3 | A |
| Example 1-3 | Tomato | Flooded hydroponic method | Phenol resin sponge | 5 cm × 5 cm | 12 | 15 | 6.5 | 23 | 8.1 | 6.4 | A |
| Example 1-4 | Tomato | Flooded hydroponic method | Rock wool | 5 cm × 5 cm | 12 | 15 | 4.5 | 28 | 7.3 | 4.9 | A |
| Example 1-5 | Tomato | Flooded hydroponic method | Rock wool | 5 cm × 5 cm | 12 | 15 | 3.5 | 30 | 6.2 | 3.1 | A |
| Example 1-6 | Tomato | Flooded hydroponic method | Urethane sponge | 3 cm × 3 cm | 12 | 15 | 6.6 | 22 | 8.5 | 6.3 | A |
| Example 1-7 | Tomato | Flooded hydroponic method | Urethane sponge | 6 cm × 6 cm | 12 | 15 | 6.3 | 20 | 8.4 | 6.2 | A |
| Example 1-8 | Tomato | Flooded hydroponic method | Urethane sponge | 2.5 cm × 2.5 cm | 12 | 15 | 6.4 | 22 | 8.6 | 6.0 | B |
| Example 1-9 | Tonlato | Flooded hydroponic method | Urchane sponge | 7 cm × 7 cm | 12 | 15 | 6.5 | 24 | 8.0 | 5.8 | A |
| Example 1-10 | Tontato | Flooded hydroponic method | Urchane sponge | 5 cm × 5 cm | 30 | 30 | 6.2 | 21 | 8.8 | 6.5 | A |
| Example 1-11 | Tomato | Flooded hydroponic method | Unthane sponge | 5 cm × 5 cm | 40 | 40 | 6.3 | 20 | 8.7 | 6.3 | A |
| Example 1-12 | Tomato | Flooded hydroponic method | Urchane sponge | 5 cm × 5 cm | 6 | 6 | 6.4 | 23 | 6.1 | 5.2 | B |
| Comparative Example 1-1 | Tomato | Bottom surface supply hydroponic method | Rock wool | 5 cm × 5 cm | 12 | 15 | 6.4 | — | 5.6 | 0 | — |
| | | | | | | | | | | 0 | — |
| Comparative Example 1-2 | Tomato | Bottom surface supply hydroponic method | Rock wool fine granular cotton | 4 cm × 4 cm | 13.5 | 13.5 | 6.3 | — | 5.8 | | |
| Comparative Example 1-3 | Tomato | Bottom surface supply hydroponic method | Cultivation soil | 4 cm × 4 cm | 13.5 | 13.5 | 6.5 | — | 5.5 | 0 | — |
| Comparative Example 1-4 | Tomato | Flooded hydroponic method | Rock wool | 5 cm × 5 cm | 12 | 15 | 3.1 | — | 4.6 | 0 | — |

| | Item | Method of raising seedlings | Support | Size of support (area of support surface) | Distance between strains [cm] Longitudinal direction | Distance between strains [cm] Lateral direction | Dissolved oxygen concentratin of culture solution [mg/l] | Period for budding (days after start of raising seedlings) | Average number of leaves [leaves/strain] | Average number of flowering [flowers/strain] | Growth potential after planting |
|---|---|---|---|---|---|---|---|---|---|---|---|
| Example 1-1 | Tomato | Flooded hydroponic method | Rock wool | 5 cm × 5 cm | 12 | 15 | 6.3 | 23 | 8.6 | 6.5 | A |
| Example 1-2 | Tomato | Flooded hydroponic method | Urethane sponge | 5 cm × 5 cm | 12 | 15 | 6.4 | 21 | 8.7 | 6.3 | A |
| Example 1-3 | Tomato | Flooded hydroponic method | Phenol resin sponge | 5 cm × 5 cm | 12 | 15 | 6.5 | 23 | 8.1 | 6.4 | A |
| Example 1-4 | Tomato | Flooded hydroponic method | Rock wool | 5 cm × 5 cm | 12 | 15 | 4.5 | 28 | 7.3 | 4.9 | A |
| Example 1-5 | Tomato | Flooded hydroponic method | Rock wool | 5 cm × 5 cm | 12 | 15 | 3.5 | 30 | 6.2 | 3.1 | A |
| Example 1-6 | Tomato | Flooded hydroponic method | Urethane sponge | 3 cm × 3 cm | 12 | 15 | 6.6 | 22 | 8.5 | 6.3 | A |

TABLE 1-continued

| | | | | | | | | | | | |
|---|---|---|---|---|---|---|---|---|---|---|---|
| Example 1-7 | Tomato | Flooded hydroponic method | Urethane sponge | 6 cm × 6 cm | 12 | 15 | 6.3 | 20 | 8.4 | 6.2 | A |
| Example 1-8 | Tomato | Flooded hydroponic method | Urethane sponge | 2.5 cm × 2.5 cm | 12 | 15 | 6.4 | 22 | 8.6 | 6.0 | B |
| Example 1-9 | Tomato | Flooded hydroponic method | Urethane sponge | 7 cm × 7 cm | 12 | 15 | 6.5 | 24 | 8.0 | 5.8 | A |
| Example 1-10 | Tomato | Flooded hydroponic method | Urethane sponge | 5 cm × 5 cm | 30 | 30 | 6.2 | 21 | 8.8 | 6.5 | A |
| Example 1-11 | Tomato | Flooded hydroponic method | Urethane sponge | 5 cm × 5 cm | 40 | 40 | 6.3 | 20 | 8.7 | 6.3 | A |
| Example 1-12 | Tomato | Flooded hydroponic method | Urethane sponge | 5 cm × 5 cm | 6 | 6 | 6.4 | 23 | 6.1 | 5.2 | B |
| Comparative Example 1-1 | Tomato | Bottom surface supply hydroponic method | Rock wool | 5 cm × 5 cm | 12 | 15 | 6.4 | — | 5.6 | 0 | — |
| Comparative Example 1-2 | Tomato | Bottom surface supply hydroponic method | Rock wool fine granular cotton | 4 cm × 4 cm | 13.5 | 13.5 | 6.3 | — | 5.8 | 0 | — |
| Comparative Example 1-3 | Tomato | Bottom surface supply hydroponic method | Cultivation soil | 4 cm × 4 cm | 13.5 | 13.5 | 6.5 | — | 5.5 | 0 | — |
| Comparative Example 1-4 | Tomato | Flooded hydroponic method | Rock wool | 5 cm × 5 cm | 12 | 15 | 3.1 | — | 4.5 | 0 | — |

As shown in Table 1, in the method of cultivating a fruit vegetable plant according to Example 1-1 to Example 1-12, in which seedlings of the fruit vegetable plant is raised in an environment where the temperature, the relative humidity, and the light conditions are controlled by a flooded hydroponic method in which a culture solution having a dissolved oxygen concentration of 3.2 mg/l to 7.0 mg/l is used, it can be seen that the period until budding is short, and the number of leaves and the number of flowering are large as compared with the methods of cultivating a fruit vegetable plant according to Comparative Example 1-1 to Comparative Example 1-4.

In addition, it is considered that since the area of the support surface of the support used in raising seedlings of Example 1-8 was smaller than the area of the support surface of the support used in the raising seedlings of other Examples, and the extended roots were damaged when the support and the tomato plant body were removed from the panel after raising seedlings, the growth potential after planting of Example 1-8 were inferior to those of the other Examples.

In addition, the area of the support surface of the support used in raising seedlings of Example 1-9 was larger than the area of the support surface of the support used in the raising seedlings of other Examples, and at the late seedling raising period, it was difficult for the support to support the tomato plant body because of the deflection of the support, and thus the support fell into the culture solution several times. Since the roots were damaged because of the falling, it was considered that the average number of leaves and the average number of flowering in Example 1-9 were inferior to those in Example 1-2 and the like. Since this damaged tomato plant body was not selected for carrying out cultivation after planting, the growth potential after planting of Example 1-9 was good.

In addition, it is considered that since the distance between strains in the raising seedlings of Examples 1-12 was smaller than the distance between strains in the raising seedlings of the other Examples, and the shadow of the leaf of one tomato plant body overlapped on the leaves of the other tomato plant bodies during the seedling raising period, the growth potential of Example 1-12 after planting is inferior to that of the other Examples.

From the above, it can be seen that in the raising seedlings performed in Example 1-1 to Example 1-12, the period until budding can be shorten, and efficient cultivation of a fruit vegetable plant is possible.

In addition, it can be seen that both in the raising seedlings by the Ebb & Flow hydroponic method (bottom surface supply hydroponic method) performed in Comparative Example 1-1 to Comparative Example 1-3 and the raising seedlings by the flooded hydroponic method using a culture solution having a dissolved oxygen concentration less than 3.2 mg/l performed in Comparative Example 1-4, since budding was not confirmed and the period until budding was not shorten, it is difficult to efficiently cultivate a fruit vegetable plant.

Example 2-1

(Germination)

Melon seeds (variety: RENON (registered trademark), manufactured by TAKII & Co., Ltd) were seeded on a support A ("Yasaihana Pot" (registered trademark) which is 5 cm×5 cm×5 cm square rock wool, manufactured by Nippon Rockwool Corporation) sufficiently containing pure water, stored for 3 days in a dark environment at a temperature of 28° C. and a relative humidity of 70%, and germinated to obtain a melon plant body.

(Raising Seedlings)

40 strains of melon plant bodies having a similar degree of growth were selected, and the supports A were fixed to 40 holes included in a panel provided in the flooded hydroponic seedling raising apparatus.

The flooded hydroponic seedling raising apparatus included a panel having holes for fixing the support, a culture solution tank in which the culture solution was accommodated, a circulation mechanism that carries out supplying of the culture solution to the culture solution tank and discharging of the culture solution from the culture solution tank, an oxygen supply mechanism (an air pump) provided in the culture solution tank, an electric conductivity meter of a culture solution provided in the culture solution tank, a dissolved oxygen concentration monitor device, and a pH monitor device.

The distance between strains in the above-described panel was 12 cm in the longitudinal direction and 15 cm in the lateral direction.

In addition, the culture solution accommodated in the culture solution tank was a culture solution (dissolved oxygen concentration: 6.3 mg/l, EC value: 1.3 dS/m, pH: 6.0) obtained by diluting "Hyponica liquid fertilizer" manufactured by Kyowa Co., Ltd. with pure water was used.

In addition, a flow rate of the culture solution in the supply and discharge of the culture solution by the circulation mechanism was 4.0 l/min.

In addition, the panel was an expanded polystyrene having a thickness of 2 cm, and the distance between the liquid surface of the culture solution accommodated in the culture solution tank and the surface of the panel on the culture solution tank side was 5 mm.

Using the above-described flooded hydroponic seedling raising apparatus, raising seedlings was carried out in an environment in which temperature, humidity, light conditions, and the like were controlled as follows.

(Seedling Raising Conditions)
- Light source: white LED (PGL-NE-200NWD), manufactured by Ryoden Corporation
- Light intensity: 200 μmol/m$^2$·s
- Light-dark cycle (light period/dark period): 16 hours/8 hours
- Temperature: 27° C. (light period), 19° C. (dark period)
- Relative humidity: 80%
- Carbon dioxide concentration: 1,000 ppm
- Seedling raising period: 30 days (Cultivation after Planting)

10 strains each of the melon plant bodies after raising seedlings were planted, and cultivation was carried out for 20 days under the following cultivation conditions. In the planting of the plant body, 10 strains having good growth and having a similar degree of growth were selected.

(Cultivation Conditions)
- Light source: LED, CIVILIGHT, manufactured by Showa Denko K.K.
- Light intensity: 250 μmol/m$^2$·s
- Light-dark cycle (light period/dark period): 14 hours/10 hours
- Temperature: 25° C. (light period), 17° C. (dark period)
- Relative humidity: 60%
- Carbon dioxide concentration: 400 ppm
- Fertilization method: flooded hydroponic cultivation
- Liquid fertilizer: "Hyponica liquid fertilizer" manufactured by Kyowa Co., Ltd. was used by being diluted with pure water
- EC value of liquid fertilizer: 2.0 dS/m Comparative Example 2-1

Germination, raising seedlings, and cultivation after planting were carried out in the same manner as in Example 2-1, except that raising seedlings was carried out according to the Ebb & Flow hydroponic method (bottom surface supply hydroponic method) instead of the flooded hydroponic method.

In the supply of the culture solution in the raising seedlings by the Ebb & Flow hydroponic method, the support A was disposed on a panel having a plurality of culture solution supply holes such that the distance between strains was 15 cm in the longitudinal direction and 12 cm in the lateral direction, and the supply was performed once for 1 minute every 12 hours such that the support A was immersed in the culture solution from the lower surface thereof to 1 cm.

The culture solution, light conditions, temperature conditions, and humidity conditions which are used, are the same as those in Example 2-1.

<<Confirmation at Timing of Budding>>

In Examples and Comparative Examples, the time when the formation of buds having a major axis length of 1 mm or more was confirmed in more than half of the melon plant bodies was confirmed, and the results were summarized in Table 2 as the number of days from the start of raising seedlings.

In Examples and Comparative Examples, budding of the melon plant body was not confirmed during the seedling raising period, but budding was confirmed during cultivation after planting.

<<Confirmation of Number of Leaves Per Strain>>

The number of leaves of the melon plant bodies after raising seedlings in Examples and Comparative Examples was confirmed, averaged, and summarized in Table 2.

<<Confirmation of Number of Flowering Per Strain>>

The number of flowering in first flower cluster of the melon plant bodies in Examples and Comparative Examples was confirmed, averaged, and summarized in Table 2.

The number of flowering includes the number of buds having a major axis length of 1 mm or more among flowered buds and buds before flowering.

In addition, the first flower cluster refers to a flower cluster including the bud confirmed first.

<<Confirmation of Growth Potential after Planting>>

In Examples and Comparative Examples, the state of the melon plant body which had been cultivated for 20 days after planting was evaluated based on the following evaluation standard and is summarized in Table 2.

(Evaluation Standard)
- A: New flowering and fruiting were confirmed in the 10 strains of the melon plant bodies, and all of the growth was good.
- B: One or more strains of the melon plant bodies with no new flowering were confirmed.
- C: One or more strains of melon plant bodies withered.

TABLE 2

| | Item | Method of raising seedlings | Support | Size of support (area of support surface) | Distance between strains [cm] Longitudinal direction | Distance between strains [cm] Lateral direction | Dissolved oxygen concentration of culture solution [mg/l] | Period for budding (days after start of raising seedlings) | Average number of leaves [leaves/strain] | Average number of flowering [flowers/strain] | Growth potential after planting |
|---|---|---|---|---|---|---|---|---|---|---|---|
| Example 2-1 | Melon | Flooded hydroponic method | Rock wool | 5 cm × 5 cm | 12 | 15 | 6.5 | 52 | 6.5 | 1.8 | A |
| Comparative Example 2-1 | Melon | Bottom surface supply hydroponic method | Rock wool | 5 cm × 5 cm | 12 | 15 | 6.3 | 78 | 4.4 | 1.1 | B |

As shown in Table 2, in the method of cultivating a fruit vegetable plant according to Example 2-1, in which seedlings of the fruit vegetable plant is raised in an environment where the temperature, the relative humidity, and the light conditions are controlled by a flooded hydroponic method in which a culture solution having a dissolved oxygen concentration of 3.2 mg/l to 7.0 mg/l is used, it can be seen that the period until budding is short, and the number of leaves and the number of flowering are large as compared with the methods of cultivating a fruit vegetable plant according to Comparative Example 2-1. In addition, as shown in Table 2, it can be seen that the method of cultivating a fruit vegetable plant according to Example 2-1 is excellent in growth potential after planting as compared with the method of cultivating a fruit vegetable plant according to Comparative Example 2-1.

The disclosure of Japanese Patent Application No. 2021-104916 filed on Jun. 24, 2021 is incorporated herein by reference in its entirety. All documents, patent applications, and technical standards disclosed in this specification are incorporated in this specification by reference such that the incorporation of each of the documents, the patent applications, and the technical standards by reference is specific and is as detailed as each of the documents, the patent applications, and the technical standards.

What is claimed is:

1. A method of cultivating a fruiting vegetable plant, comprising:
raising seedlings of the fruiting vegetable plant by a flooded hydroponic method using a culture solution having a dissolved oxygen concentration of 3.2 mg/l or more, in an environment in which at least one condition selected from the group consisting of temperature, relative humidity, and light is controlled;
planting the fruiting vegetable plant after the raising seedlings; and
cultivating the fruiting vegetable plant after the planting using a cultivation apparatus comprising at least one selected from the group consisting of a light source for irradiating the fruiting vegetable plant with artificial light from at least one of an upper surface direction or side surface direction of the fruiting vegetable plant, a hydroponic cultivation mechanism, and a temperature/humidity control mechanism.

2. The method of cultivating a fruiting vegetable plant according to claim 1,
wherein the raising seedlings of the fruiting vegetable plant is carried out by using a flooded hydroponic seedling raising apparatus comprising a support that supports the fruiting vegetable plant, a panel having a hole for fixing the support, and a culture solution tank in which the culture solution is accommodated, and
an area of a support surface of the support is 9 cm$^2$ to 40 cm$^2$.

3. The method of cultivating a fruiting vegetable plant according to claim 2,
wherein the panel has a plurality of the holes for fixing the support, and
an interval between adjacent fruiting vegetable plants supported by the support is 10 cm to 30 cm.

4. The method of cultivating a fruiting vegetable plant according to claim 2,
wherein the flooded hydroponic seedling raising apparatus comprises a circulation mechanism that carries out supplying of the culture solution to the culture solution tank and discharging of the culture solution from the culture solution tank, and
a flow rate of the culture solution is 2.0 l/min to 20 l/min in at least one of the supplying of the culture solution to the culture solution tank or the discharging of the culture solution from the culture solution tank.

5. The method of cultivating a fruiting vegetable plant according to claim 2,
wherein the flooded hydroponic seedling raising apparatus comprises an oxygen supply mechanism that supplies oxygen to the culture solution.

6. The method of cultivating a fruiting vegetable plant according to claim 2, wherein the support is selected from the group consisting of a urethane sponge, a phenol resin sponge, a rock wool, and a support table provided with a water-retaining sheet.

7. The method of cultivating a fruiting vegetable plant according to claim 1,
wherein the fruiting vegetable plant is a tomato or a melon.

8. The method of cultivating a fruiting vegetable plant according to claim 1,
wherein the dissolved oxygen concentration is 3.5 mg/l or more.

9. The method of cultivating a fruiting vegetable plant according to claim 1,
wherein the dissolved oxygen concentration is 4.5 mg/l or more.

10. The method of cultivating a fruiting vegetable plant according to claim 1,
wherein the dissolved oxygen concentration is 6.0 mg/l or more.

11. The method of cultivating a fruiting vegetable plant according to claim 1, wherein the dissolved oxygen concentration is 7.87 mg/l or less.

12. A method of cultivating a fruiting vegetable plant, comprising:
raising seedlings of the fruiting vegetable plant by a flooded hydroponic method using a culture solution having a dissolved oxygen concentration of 3.2 mg/l or more, in an environment in which at least one condition selected from the group consisting of temperature, relative humidity, and light is controlled,
wherein the raising seedlings of the vegetable plant is carried out by using a flooded hydroponic seedling raising apparatus comprising a support that supports the vegetable plant, a panel having a hole for fixing the support, and a culture solution tank in which the culture solution is accommodated,
an area of a support surface of the support is 9 cm$^2$ to 40 cm$^2$,
the panel has a plurality of the holes for fixing the support, and
an interval between adjacent vegetable plants supported by the support is 10 cm to 30 cm.

13. The method of cultivating a fruiting vegetable plant according to claim 12,
wherein the flooded hydroponic seedling raising apparatus comprises a circulation mechanism that carries out supplying of the culture solution to the culture solution tank and discharging of the culture solution from the culture solution tank, and
a flow rate of the culture solution is 2.0 l/min to 20 l/min in at least one of the supplying of the culture solution to the culture solution tank or the discharging of the culture solution from the culture solution tank.

14. The method of cultivating a fruiting vegetable plant according to claim 12,
wherein the flooded hydroponic seedling raising apparatus comprises an oxygen supply mechanism that supplies oxygen to the culture solution.

15. The method of cultivating a fruiting vegetable plant according to claim 12, wherein the support is selected from the group consisting of a urethane sponge, a phenol resin sponge, a rock wool, and a support table provided with a water-retaining sheet.

16. The method of cultivating a fruiting vegetable plant according to claim 12,
wherein the fruiting vegetable plant is a tomato or a melon.

17. The method of cultivating a fruiting vegetable plant according to claim 12,
wherein the dissolved oxygen concentration is 3.5 mg/l or more.

18. The method of cultivating a fruiting vegetable plant according to claim 12,
wherein the dissolved oxygen concentration is 4.5 mg/l or more.

19. The method of cultivating a fruiting vegetable plant according to claim 12,
wherein the dissolved oxygen concentration is 6.0 mg/l or more.

20. The method of cultivating a fruiting vegetable plant according to claim 12,
wherein the dissolved oxygen concentration is 7.87 mg/l or less.

* * * * *